United States Patent [19]
Yasue et al.

[11] Patent Number: 5,469,733
[45] Date of Patent: Nov. 28, 1995

[54] CANTILEVER FOR ATOMIC FORCE MICROSCOPE AND METHOD OF MANUFACTURING THE CANTILEVER

[75] Inventors: Takao Yasue; Tadashi Nishioka, both of Itami, Japan

[73] Assignee: Mitsubishi Denki Kabushiki Kaisha, Tokyo, Japan

[21] Appl. No.: 194,169

[22] Filed: Feb. 9, 1994

[30] Foreign Application Priority Data

Feb. 16, 1993 [JP] Japan ................................. 5-026841

[51] Int. Cl.⁶ ............................. G01B 5/28; H01J 37/26
[52] U.S. Cl. ........................... 73/105; 250/306; 250/307
[58] Field of Search ............................ 73/105; 250/306, 250/307, 423 F

[56] References Cited

U.S. PATENT DOCUMENTS

| | | | |
|---|---|---|---|
| 4,998,016 | 3/1991 | Nose et al. | 250/307 |
| 5,021,364 | 6/1991 | Akamine et al. | 250/306 |
| 5,051,379 | 9/1991 | Bayer et al. | 437/225 |
| 5,066,358 | 11/1991 | Quate et al. | 250/306 |
| 5,166,520 | 11/1992 | Prater et al. | 250/307 |
| 5,268,571 | 12/1993 | Yamamoto et al. | 250/307 |
| 5,317,533 | 5/1994 | Quate et al. | 250/307 |
| 5,334,835 | 8/1994 | Nakayama et al. | 250/307 |

OTHER PUBLICATIONS

Chalmers et al., "Determination of Tilted Superlattice Structure by Atomic Force Microscopy", Applied Physics Letter 55, Dec., 1989, pp. 2491–2493.

Primary Examiner—Richard Chilcot
Assistant Examiner—George M. Dombroske
Attorney, Agent, or Firm—Leydig, Voit & Mayer

[57] ABSTRACT

A cantilever for an atomic force microscope includes a probe and a cantilever body supporting the probe, the probe deflecting in response to an atomic force between said probe and a sample, at least the surface of the probe including one of a resist film and a sputtered film. One method of manufacturing the cantilever includes selectively etching the surface of a silicon substrate to form an etch pit, forming a resist film in at least the etch pit, forming a nitride film on the resist film, forming a glass base plate on the nitride film in a predetermined area not including the etch pit, and removing the silicon substrate. An atomic force microscope is also provided in which the cantilever is used to measure an atomic force between a sample and the probe having a desired film on a surface. A sample surface evaluating method is further provided by which the adhesion between the desired film or substance and the sample surface can be evaluated quantitatively from the measured atomic force without damaging the sample surface.

9 Claims, 18 Drawing Sheets

FIG. 14ℓ

FIG. 16ℓ 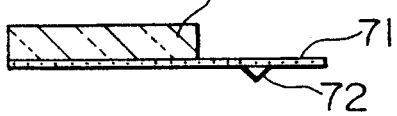

CANTILEVER FOR ATOMIC FORCE MICROSCOPE AND METHOD OF MANUFACTURING THE CANTILEVER

BACKGROUND OF THE INVENTION

1. Field of the Invention

The present invention relates to a cantilever for use in an atomic force microscope. The present invention also relates to a method of manufacturing such a cantilever, an atomic force microscope and a sample surface adhesion evaluating method each using the cantilever.

2. Description of the Related Art

Hitherto, adhesion of a resist film which is formed on silicon substrates, for example, has been evaluated by scratching the formed resist film with a testing machine and visually observing a tear or scratch produced in the resist film. Alternatively, the adhesion has been evaluated by producing a cut through a resist film with a knife, sticking an adhesive tape onto the cut film surface and then peeling the tape off therefrom, and visually observing the degree by which the resist film is peeled off with the adhesive tape.

In other words, since adhesion between the sample surface and a film formed thereon was evaluated by visual inspection in the past, it was impossible to carry out quantitative evaluation. Therefore, a demand for any method which is capable of evaluating the adhesion in a quantitative manner has existed.

Meanwhile, there is known an atomic force microscope of the type utilizing an atomic force that is generated, when a probe provided on a cantilever comes closer to the sample surface, due to the van der Waals force between the probe and the sample. More specifically, the cantilever is relatively scanned over the sample surface with an accuracy on the atomic order while the sample position is controlled so that a warping of the cantilever caused by the atomic force is kept constant. An image showing unevenness of the sample surface is depicted from resultant control amounts.

A conventional general atomic force microscope includes a cantilever as shown in FIG. 17. The cantilever comprises a cantilever body 1 which is fixed to one end of a glass base plate 3 having dimensions of about 2 mm×5 mm and has a V-shape in its plan view, and a probe 2 at the distal end of the cantilever body 1. By way of example, the cantilever body 1 and the probe 2 are each made of silicon nitride, and the probe 1 in the form of a pyramid with sides of its bottom surface being 5 μm is formed at the distal end of the cantilever body 1 which is 100 μm long and 0.7 μm thick. The cantilever has a spring constant of 0.58 N/m and a resonance frequency of 77 kHz.

A method of manufacturing such a cantilever is shown fin FIGS. 18a–18i. First, a resist 5 is applied to the surface of a (100) silicon substrate 4 as shown in FIG. 18a, and a portion of the resist 5 is removed in a rectangular pattern as shown in FIG. 18b. Then, as shown in FIG. 18c, the silicon substrate 4 is subjected to the wet etching process with the resist 5 serving as a mask, so that the silicon substrate 4 is selectively etched in the (111) direction to form an etch pit 4a. After that, the resist 5 is removed as shown in FIG. 18d, and a silicon nitride film 1a is formed over the entire surface of the silicon substrate 4 as shown in FIG. 18e.

Subsequently, as shown in FIG. 18f, a glass plate 3a is bonded onto the silicon nitride film 1a. The surface of the glass plate 3a facing the silicon nitride film 1a is divided into two areas by a previously prepared saw cut 3b. A chromium coating 3c serving to release the glass surface from the silicon nitride film 1a is formed on the surface area of the glass plate 3a which lies above the etch pit 4a in the silicon substrate 4. Then, as shown in FIG. 18g, the glass plate 3a is saw-cut through the remaining portion behind the saw cut 3b for completely dividing the glass plate 3a into portions 3d and 3e. Thereafter, as shown in FIG. 18h, the glass plate portion 3e lying above the etch pit 4a is removed. Finally, by removing the silicon substrate 4, a cantilever as shown in FIG. 18i is obtained.

The operation of the conventional atomic force microscope will be described with reference with FIG. 19. In the atomic force microscope, a repulsion acts between the probe 2 at the distal end of the cantilever and a sample 8 due to the van der Waals force between the atoms in the probe 2 and those in the sample 8, causing the cantilever to warp. A laser light 6a emitted from a laser oscillator 6 is focused through a lens 10 onto an upper surface of the cantilever body 1 at the distal end, and the reflected light therefrom enters a photodetector 7. When the cantilever warps, the position where the reflected light enters the photodetector 7 is varied and, therefore, a minute "warp" of the cantilever can be detected from the incident position of the reflected light. A piezoelectric device 9 is operated to scan in each of the X and Y directions while being subjected to feedback control in the Z direction so that the incident position of the reflected light onto the photodetector 7 is kept fixed. An image showing surface unevenness of the sample 8 can be output on a display by using the voltages applied to the piezoelectric device 9 during the scan in relation to the X, Y and Z directions.

In the atomic force microscope thus constructed, the cantilever body 1 is made of a high sensitivity material, i.e., silicon nitride, so that the cantilever body 1 is displaced by a very minute force on the order of $10^{-7}$ to $10^{-9}$. Taking into account convenience in manufacture of the microscope, too, the probe 2 is also made of the same material, i.e., silicon nitride.

As described above, adhesion of the sample surface has conventionally been evaluated by damaging a film formed on the sample surface by scratching or intentionally peeling off the film, and then visually inspecting a degree of the damage. This has raised problems that the adhesion cannot be evaluated quantitatively and evaluation of the adhesion entails damage of the sample surface on which the film has already been formed.

The present invention has been made to solve the above problems and, since an atomic force acting between a probe and the sample surface can be measured in atomic force microscopes, it is intended to measure such an atomic force and to quantitatively evaluate adhesion between the sample surface and a substance formed thereon based on a finding that adhesion between the sample surface and a substance formed thereon is related with the atomic force acting between the substance and the sample surface.

In an attempt to detect an atomic force acting between a substance M1 forming a probe and a substance M2 forming the sample surface for evaluating the adhesion produced when the substances M1 and M2 are made adhere to each other by the atomic force, only the atomic force between silicon nitride and the material M2 could be measured in the past because the substance M1 forming the probe was limited to silicon nitride from the standpoint of sensitivity.

Meanwhile, when manufacturing semiconductor integrated circuit devices, it is necessary to adhesively form, in addition to a nitride film, other various films such as an oxide film, polysilicon film and aluminum film on the surfaces of semiconductor substrates, and to form some of those films as laminated layers. Furthermore, resist patterns are often formed on those various films in photolithography steps for the purpose of patterning the films. Accordingly, there has also been a need for evaluating not only the adhesion between silicon nitride and any other substance, but also the adhesion produced when two substances other than silicon nitride are formed in mutually adhering relation.

However, since the conventional atomic force microscope described above could measure only the adhesion between silicon nitride and the other substance M2, as previously discussed, it was impossible to evaluate the adhesion produced when two substances other than silicon nitride are formed in mutually adhering relation, by using the conventional atomic force microscope.

SUMMARY OF THE INVENTION

In view of the state-of-art explained above, an object of the present invention is to provide an atomic force microscope and a sample surface adhesion evaluating method in which, by forming the probe surface of a substance to be formed on the sample surface, the adhesion between the substance and the sample surface can be evaluated quantitatively without damaging the sample surface.

Another object of the present invention is to provide a cantilever for use in such an atomic force microscope and a method of manufacturing the cantilever.

A cantilever for an atomic force microscope according to the first aspect of the present invention comprises a probe and a cantilever body supporting the probe and being curved depending on an atomic force acting between the probe and a sample, at least the surface of the probe being formed of one of a resist film and a sputtered film.

A method of manufacturing a cantilever for an atomic force microscope according to the second aspect of the present invention comprises the steps of selectively etching the surface of a silicon substrate to form an etch pit in the substrate surface, forming a resist film on at least an etch-pit portion of the silicon substrate, forming a nitride film on the surface of the resist film, forming a glass base plate on the nitride film in a predetermined area other than the etch-pit portion, and removing the silicon substrate.

A method of manufacturing a cantilever for an atomic force microscope according to the third aspect of the present invention comprises the steps of selectively etching the surface of a silicon substrate to form an etch pit in the substrate surface, forming a nitride film on the surface of the silicon substrate including an etch-pit portion, forming a glass base plate on the front side of the nitride film in a predetermined area other than the etch-pit portion, removing the silicon substrate, and forming a sputtered film on the back side of the nitride film including at least the etch-pit portion.

A method of manufacturing a cantilever for an atomic force microscope according to the fourth aspect of the present invention comprises the steps of selectively etching the surface of a silicon substrate to form an etch pit in the substrate surface, filling the etch pit with a resist film, forming a nitride film on the surface of the silicon substrate including an etch-pit portion, forming a glass base plate on the nitride film in a predetermined area other than the etch-pit portion, and removing the silicon substrate.

A method of manufacturing a cantilever for an atomic force microscope according to the fifth aspect of the present invention comprises the steps of selectively etching the surface of a silicon substrate to form an etch pit in the substrate surface, forming a sputtered film in the etch pit of the silicon substrate, forming a resist film on the sputtered film to fill the etch pit with these films, forming a nitride film on the surface of the silicon substrate including an etch-pit portion, forming a glass base plate on the nitride film in a predetermined area other than the etch-pit portion, and removing the silicon substrate.

An atomic force microscope according to the sixth aspect of the present invention comprises a piezoelectric device for supporting a sample, a cantilever comprising a probe having a surface formed of a desired film, and a cantilever body supporting the probe and being curved depending on an atomic force acting between the probe and the sample, the cantilever being disposed in the proximity of the sample and supported by the piezoelectric device, a laser oscillator for radiating a laser light on the cantilever body of the cantilever, a photodetector for detecting the laser light reflected by the cantilever body of the cantilever, and a controller for applying a voltage to the piezoelectric device to move the sample, and measuring the atomic force acting between the probe of the cantilever and the sample from an output of the photodetector.

A method of evaluating adhesion of the sample surface according to the seventh aspect of the present invention comprises the steps of moving a probe to come closer to a sample, the probe being supported by a cantilever body and having the surface formed of a desired film, radiating laser light on the cantilever body, detecting the laser light reflected by the cantilever body and measuring an atomic force acting between the prove and the sample, and evaluating adhesion between the desired film formed on the surface of the probe and the sample surface from the measured atomic force.

BRIEF DESCRIPTION OF THE DRAWINGS

FIGS. 14a to 14l are sectional views showing successive steps of a method of manufacturing the cantilever of FIG. 13, FIGS. 16a to 16l are sectional views showing successive steps of a method of manufacturing the cantilever of FIG. 15.

DESCRIPTION OF THE PREFERRED EMBODIMENTS

Hereinafter, embodiments of the present invention will be described with reference to the attached drawings.

Embodiment 1

Figure 1:
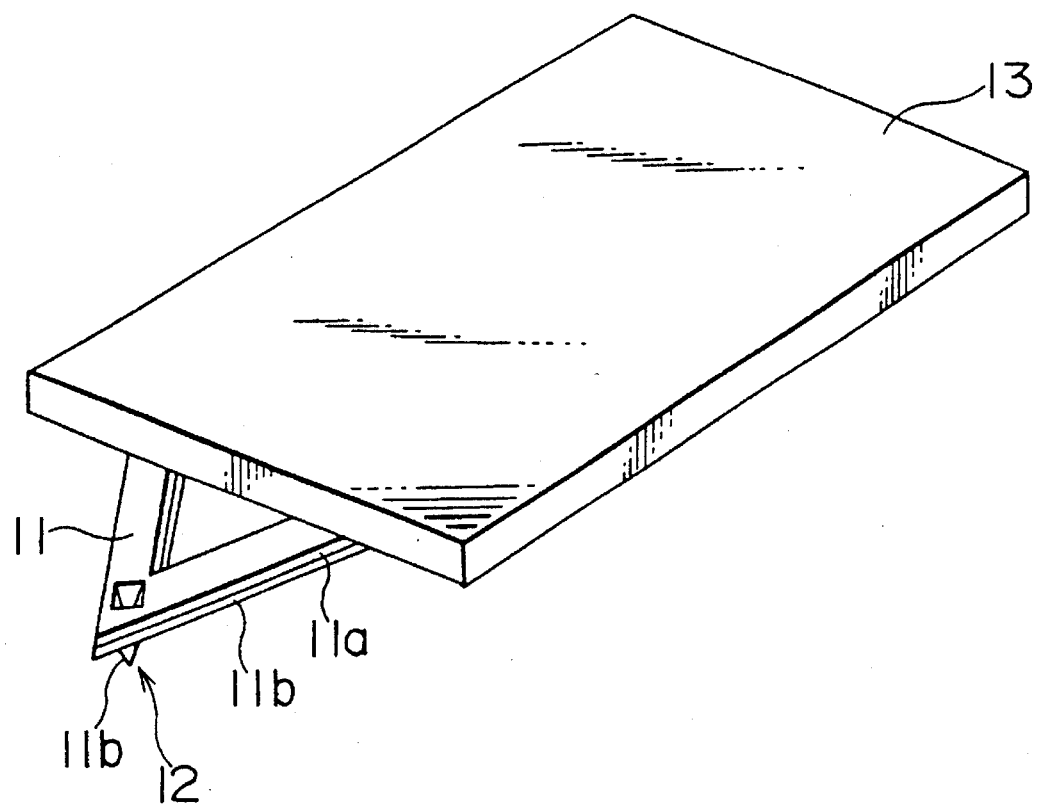
FIG. 1 is a perspective view showing a cantilever according to Embodiment 1 of the present invention.

FIG. 1 shows a cantilever for an atomic force microscope according to Embodiment 1 of the present invention. A cantilever body 11 100 μm long and V-shaped in its plan view is fixed to one end of a rectangular glass base plate 13 which has dimensions of about 2×5 mm. A probe 12 in the form of a pyramid with its bottom surface having sides 5 μm long is disposed at the distal end of the cantilever body 11. The cantilever body 11 and the probe 12 are each a two-layer film comprising a silicon nitride ($Si_3N_4$) film 11a and a resist film 11b, each of these films being 0.7 μm thick.

Figure 2A:
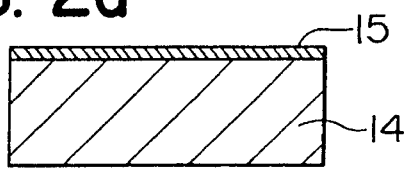
FIGS. 2a to 2i are sectional views showing successive steps of a method of manufacturing the cantilever of FIG. 1.
Figure 2B:
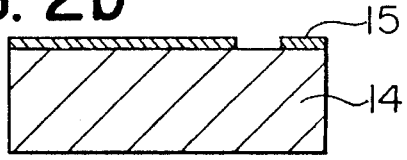
Figure 2C:
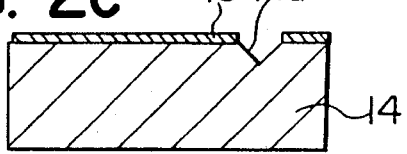
Figure 2D:
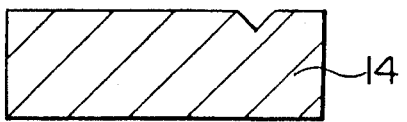
Figure 2E:
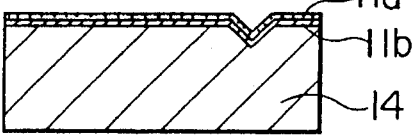

FIGS. 2a to 2i show successive steps of a method of manufacturing such a cantilever. First, a resist 15 is applied to the surface of a (100) silicon substrate 14 as shown in FIG. 2a, and a portion of the resist 15 is removed in a rectangular pattern as shown in FIG. 2b. Then, as shown in FIG. 2c, the silicon substrate 14 is subjected to the wet etching process with the resist 15 serving as a mask, so that the silicon substrate 14 is selectively etched in the (111) direction to form an etch pit 14a. After removing the resist 15 as shown in FIG. 2d, the resist film 11b is applied over the entire surface of the silicon substrate 14 and the silicon nitride film 11a is formed on the resist film 11b, as shown in FIG. 2e.

Figure 2F:
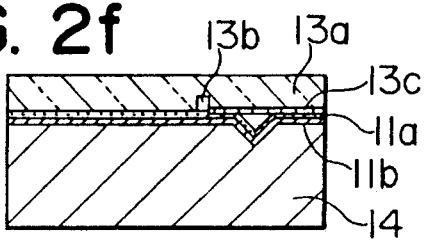
Figure 2G:
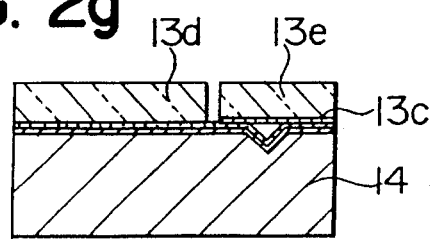
Figure 2H:
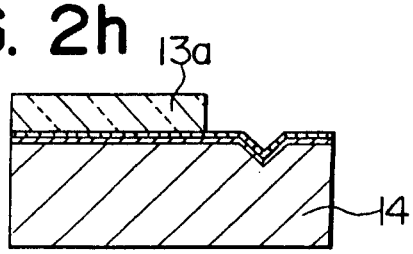
Figure 2I:
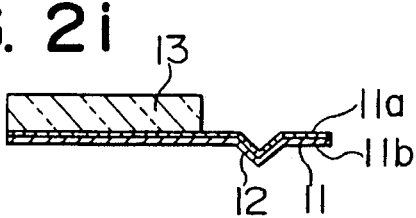

Subsequently, as shown in FIG. 2f, a glass plate 13a is bonded onto the silicon nitride film 11a. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies above the etch pit 14a in the silicon substrate 14. Then, as shown in FIG. 2g, the glass plate 13a is saw-cut through the remaining portion opposite the saw cut 13b, for completely dividing the glass plate 13a into portions 13d and 13e. Thereafter, as shown in FIG. 2h, the glass plate portion 13e lying above the etch pit 14a is removed. Finally, by removing the silicon substrate 14, a cantilever as shown in FIG. 2i is obtained.

Figure 3:
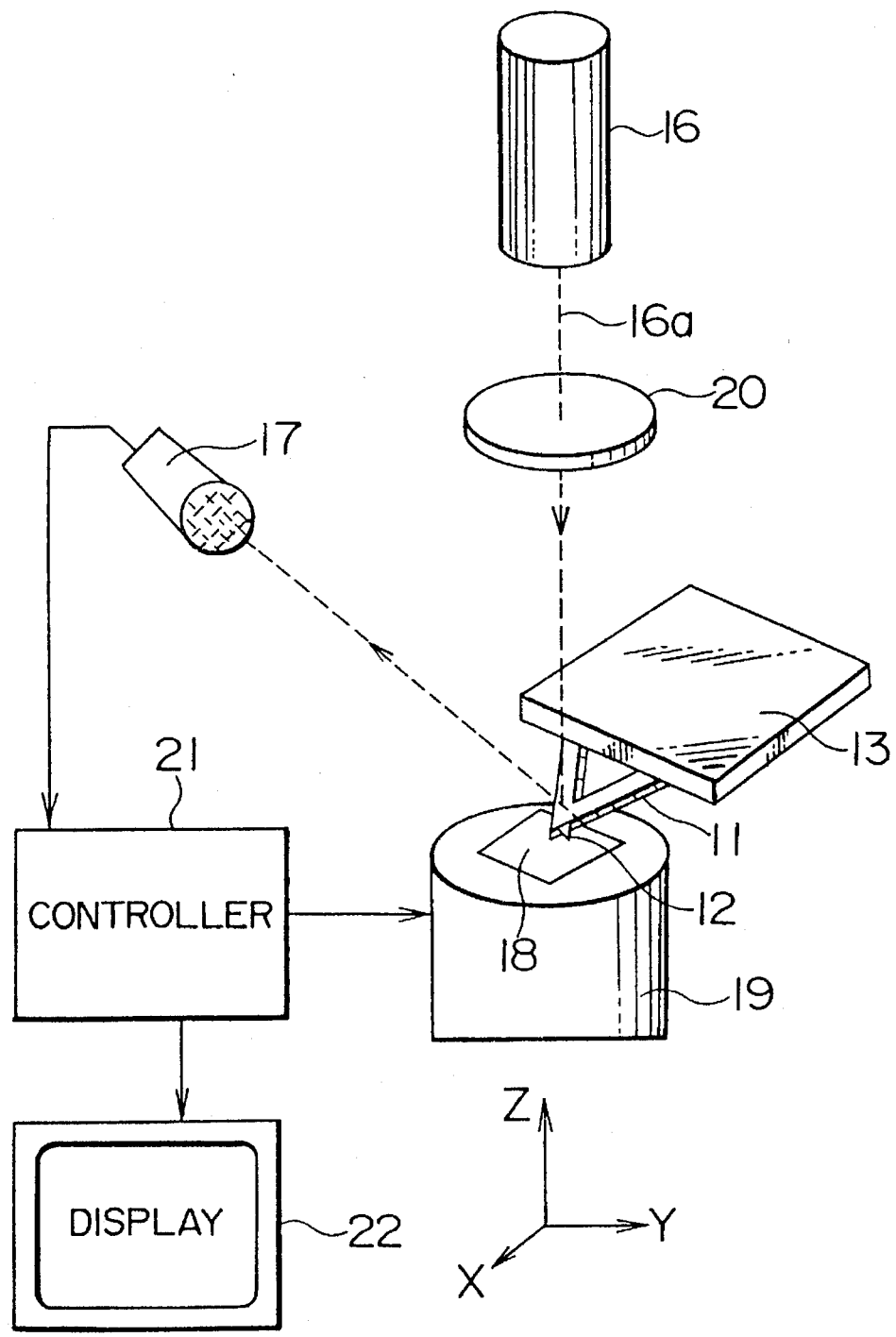
FIG. 3 is a block diagram showing an atomic force microscope according to the present invention.

FIG. 3 is a block diagram showing an atomic force microscope according to the present invention. The cantilever body 11 of the cantilever shown in FIG. 1 is disposed below a laser oscillator 16 with a lens 20 therebetween, and a piezoelectric device 19 is disposed just below the cantilever. A photodetector 17 is disposed obliquely above the cantilever, and a controller for scanning the piezoelectric device 19 in the X, Y and Z directions is connected to the photodetector 17. Further, a display 22 is connected to the controller 21.

The operation of the atomic force microscope shown in FIG. 3 will be described below. Laser light 16a is emitted from the laser oscillator 16 with a sample 18 placed on the piezoelectric device 19. The laser light 16a is focused through the lens 20 onto an upper surface of the cantilever body 11 at the distal end, and the reflected light therefrom enters the photodetector 17. When the cantilever warps a minute amount due to the atomic force acting between the probe 12 at the distal end of the cantilever and the sample 18, the position where the reflected light enters the photodetector 17 is varied correspondingly.

In the present invention, the atomic force microscope is used not to obtain an image showing unevenness of the surface of the sample 18, but to evaluate the adhesion between the probe 12 and the sample 18 based on the atomic force therebetween. By changing the piezoelectric device 19 in the Z direction and measuring a warp of the cantilever corresponding to the Z-directional displacement of the sample 18, the adhesion between the sample 18 and the resist film 11b of the cantilever can be determined quantitatively as follows.

First, the warp of the cantilever is measured from the incident position of the reflected light on the photodetector 7 when the laser light 16a is irradiated to the cantilever body 11. It is assumed here that the output voltage of the photodetector 17 is Vd and any desired set voltage is Vs. The sample 18 is moved to approach the probe 12 by using a stepping motor (not shown) which serves to move the piezoelectric device 9 in the Z direction. When the sample 18 comes into proximity with the probe 12 of the cantilever body 11, a voltage is applied to the piezoelectric device 19 from the controller 21 for moving the piezoelectric device 19 in the Z direction to make the sample 18 come ever closer to the probe 12. This produces an atomic force acting between the sample 18 and the probe 12, causing the cantilever body 11 to warp. The incident position of the reflected light on the photodetector 17 is shifted correspondingly, whereupon the output voltage Vd of the photodetector 17 is changed. When a deviation voltage represented by the sum of the output voltage Vd and the set voltage Vs becomes zero, a feedback circuit in the controller 21 is turned on to control the voltage applied to the piezoelectric device 19 so that the deviation voltage is kept at zero. The voltage applied in such a feedback position to the piezoelectric device 19 in the Z direction is assumed to be Vz.

After turning off the feedback circuit, a triangular-wave voltage of +160 V with a voltage Vc at the center is further applied to the piezoelectric device 19, thereby displacing the sample 18 upwardly and downwardly in the Z direction. The warp of the cantilever body 11 corresponding to the Z-directional displacement of the sample 18 at this time is read from the output voltage value of the photodetector 17. The relationship between the applied voltage Vz to the piezoelectric device 19 in the Z-direction and the deviation voltage Vd+Vs is represented in the form of a graph shown in FIG. 4. Thereafter, the feedback circuit is turned on to move the sample 18 in the Z direction back to the initial position.

Figure 4:
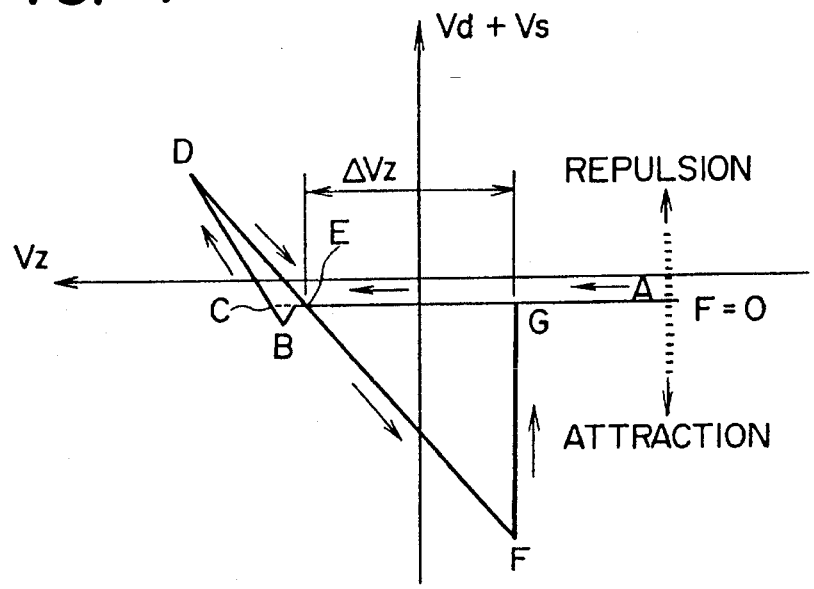
FIG. 4 is a graph for explaining a sample surface adhesion evaluating method according to the present invention.

The positional relationships between the probe 12 of the cantilever body 11 and the surface of the sample 18 at points A to G in the graph of FIG. 4 are shown respectively in FIGS. 5a to 5g. In the graph of FIG. 4, the vertical axis represents the deviation voltage Vd+Vs, i.e., the force acting between the cantilever and the surface of the sample 18. At a certain position along the vertical axis, F=0. The acting force is a repulsion in the region on the positive side along the vertical axis considered from F=0, and is an attraction in the negative region. The larger the distance from the straight line indicative of F=0, the stronger will be the acting force. On the other hand, the horizontal axis represents the voltage Vz applied to the piezoelectric device 19 in the Z direction, i.e., the Z-directional position of the sample 18. At a position toward the left, along the horizontal axis in FIG. 4, the sample 18 and the probe 12 of the cantilever body come closer to each other.

Figure 5A:
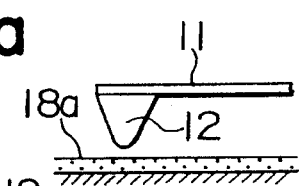
FIGS. 5a to 5g are side views showing successive behaviors of the cantilever according to the sample surface adhesion evaluating method of the present invention.
Figure 5B:
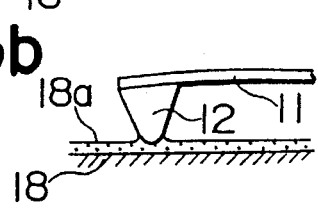
Figure 5C:
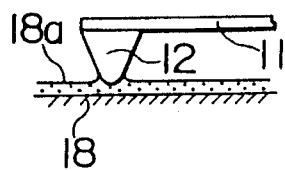
Figure 5D:
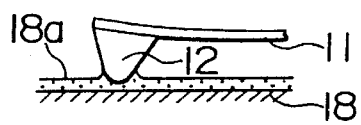

First, at the point A on the straight line of F=0, no forces act between the cantilever and the sample 18 as shown in FIG. 5a. When the voltage Vz applied to the piezoelectric device 19 is gradually increased to make the sample 18 come closer to the cantilever, an attraction abruptly acts on the cantilever at the point B in FIG. 4 because of the probe 12 being adsorbed with a layer of contaminants such as moisture on the surface of the sample 18, i.e., a so-called contaminant layer 18a, whereby the probe 12 of the cantilever comes to a position closest to the sample 18 as shown in FIG. 5b. When the sample 18 is further raised in the Z direction, the attraction acting between the probe 12 of the cantilever and the sample 18 is diminished, resulting in F=0 at the point C. After that, a repulsion acts between the probe 12 of the cantilever and the sample 18. Therefore, the warp of the cantilever body 11 is canceled at the point C as shown in FIG. 5c, and the cantilever body 11 is then curved in the direction of parting the probe 12 away from the sample 18 at the point D as shown in FIG. 5d.

Figure 5E:
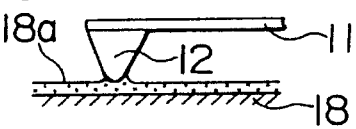
Figure 5F:
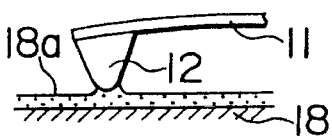
Figure 5G:
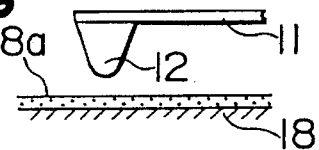

Under the above conditions, when the voltage Vz applied to the piezoelectric device 19 is gradually reduced to displace the sample 18 farther away from the cantilever, the repulsion is also diminished correspondingly, resulting in F=0 at the point E where the warp of the cantilever body 11 is canceled as shown in FIG. 5e. When the sample 18 is displaced ever farther away from the probe 12 of the cantilever body 11, an attraction now acts between the two members. The attraction is gradually increased, causing the cantilever body 11 to warp toward the sample 18 as shown in FIG. 5f. Reaching the point F, however, there occurs an abrupt jump from the attraction region to the point G, i.e, cancellation of the attraction, whereupon the probe 12 of the cantilever body 11 detaches from the contaminant layer 18a of the sample 18 so that the cantilever body 11 takes a rectilinear posture substantially free from any warp, as shown in FIG. 5g.

Through the above process, the atomic force between the sample 18 and the probe 12 can be measured quantitatively based on the movement of the sample 18 in the Z direction which is determined from the variation ΔVz in the voltage Vz applied to the piezoelectric device 19 between the point E and the point F in FIG. 4. In this embodiment, particularly, since the resist film 11b is formed on the surface of the cantilever facing the sample 18, the atomic force between the resist film and the sample 18 can be measured, making it possible to determine the adhesion between the resist film and the sample 18 from the measured atomic force. Since the contaminant layer 18a is generally present on the surface of the sample 18, the atomic force measured between the probe 12 and the sample 18 is affected by the contaminant layer 18a. Exactly speaking, therefore, the atomic force measured by the atomic force microscope is the atomic force acting between the sample surface including the contaminant layer and the probe 12 of the cantilever. But because the influence of the contaminant layer 18a is sufficiently small, the atomic force between the sample surface including the contaminant layer 18a and the probe can be used for the purpose of evaluating the adhesion of the sample surface.

The atomic force between the surface of each of six samples S1 to S6 formed of a TiN (titanium nitride) film and the resist film 11b formed on the cantilever was measured by using the cantilever of this embodiment. The surface of each of the samples S1 to S6 was prepared by first forming an oxide film in a thickness of 200 nm and then forming a TiN film in a thickness of 65 nm. Of these six samples, the samples S1 to S4 were not subjected to the lamp annealing process, but the samples S5 and S6 were subjected to the lamp annealing process. Results shown in FIG. 6 were obtained by cutting each of the samples S1 to S6 into a square shape having each side of 8 mm, attaching them onto the piezoelectric device of the atomic force microscope one after another, and measuring the atomic force between the TiN film on the surface of each sample and the resist film 11b on the cantilever by using the cantilever of FIG. 1 which has the resist film 11b. As will be seen, the samples S5 and S6 subjected to the lamp annealing process exhibited atomic forces several times those of the samples S1 to S4 not subjected to the lamp annealing process.

Figure 6:
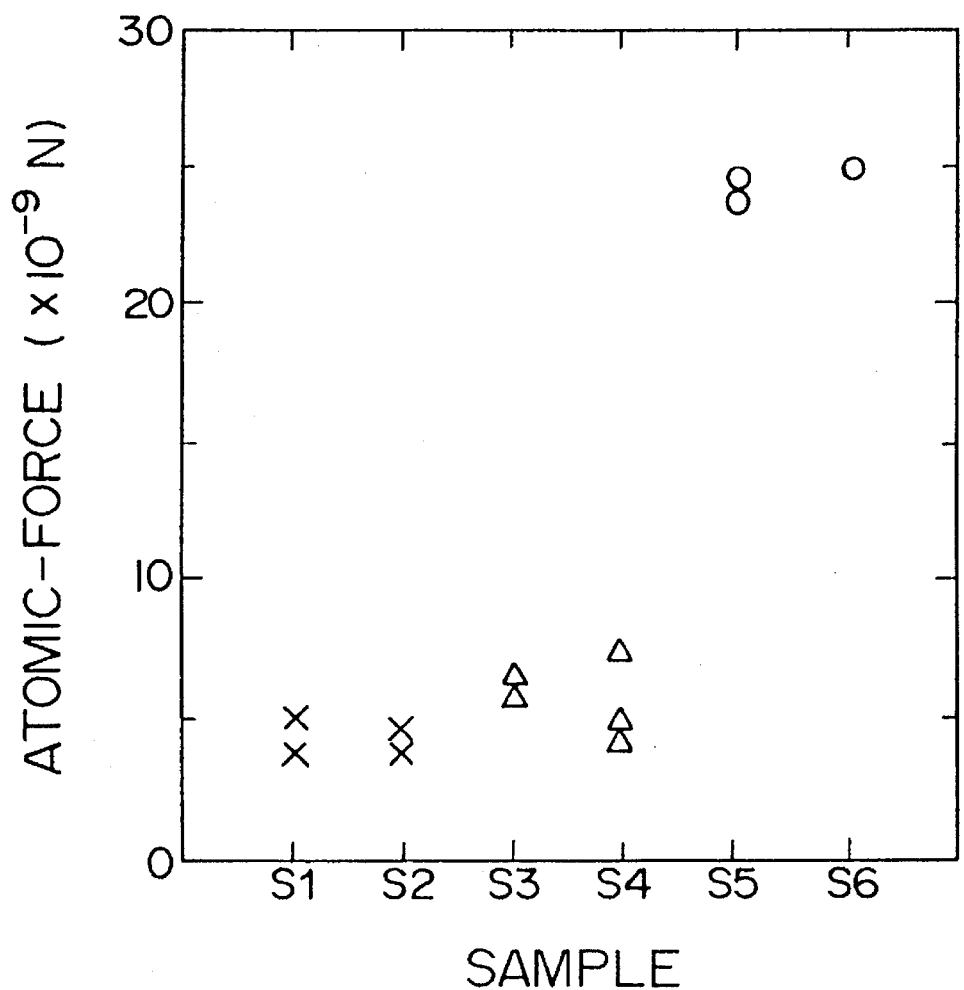
FIG. 6 is a graph showing results of evaluating adhesion of the sample surface by using the cantilever of Embodiment 1.

On the other hand, a resist film made of the same material as that of the resist film 11b on the cantilever was actually formed on the surface of each of the samples S1 to S6, and the adhesion between the surface of each sample and the resist film formed thereon was evaluated by the conventional inspection method, i.e., by producing a cut in the formed resist film with a knife, sticking an adhesive tape onto the cut resist film and then peeling it off, and visually observing the condition of peeling-off of the resist film. Results of evaluating the adhesion in three ranks of "good", "rather good" and "poor" are also shown in FIG. 6. The good, rather good and poor adhesion are indicated by O, Δ and X marks, respectively, in FIG. 6. As will be seen, the samples S1 to S4 were evaluated to be "poor" and "rather good", whereas the samples S5 and S6 were evaluated to be "good". From the results shown in FIG. 6, it is understood that the adhesion between the sample surface and the resist film formed thereon depends on the atomic force between the sample surface and the resist film on the cantilever surface, and that a greater atomic force between the sample surface and the resist film provides higher adhesion therebetween. Therefore, the adhesion between the sample and the resist film formed thereon can be measured quantitatively by measuring the atomic force between the sample surface and the resist film on the cantilever.

Furthermore, by applying an offset voltage to the piezoelectric device 19 so as to change the position of the sample 18 in the XY-plane, the adhesion at any desired point on the surface of the sample 18 can be evaluated, which enables the reliability of the measured data to be improved. The results shown in FIG. 6 were obtained by measuring the atomic forces at a plurality of points for each of the samples S1 to S5.

The resist film lib may be of various types and includes, for example, a cyclical rubber-base resist and a polyvinyl cinnamate-base resist which are used as photoresists, polymethyl methacrylate (PMMA) and polymethyl isopropenylketone (PMIPK) which are used as far-ultraviolet resists, a silicone resin-base resist and an epoxy high-polymer-base resin which are used as electron beam resists, and an X-ray resist.

Additionally, as with the prior art, an image showing surface unevenness of the sample 18 can also be obtained by using the atomic force microscope shown in FIG. 3. In this case, the piezoelectric device 19 is controlled by the controller 21 to scan in each of the X and Y directions while being subjected to feedback control in the Z direction so that the incident position of the reflected light onto the photodetector 7 is kept fixed. An image showing surface unevenness of the sample 18 can be displayed on the display 22 by using the voltages applied to the piezoelectric device 19 from the controller 21 during the scan in relation to the X, Y and Z directions.

Embodiment 2

Figure 7:
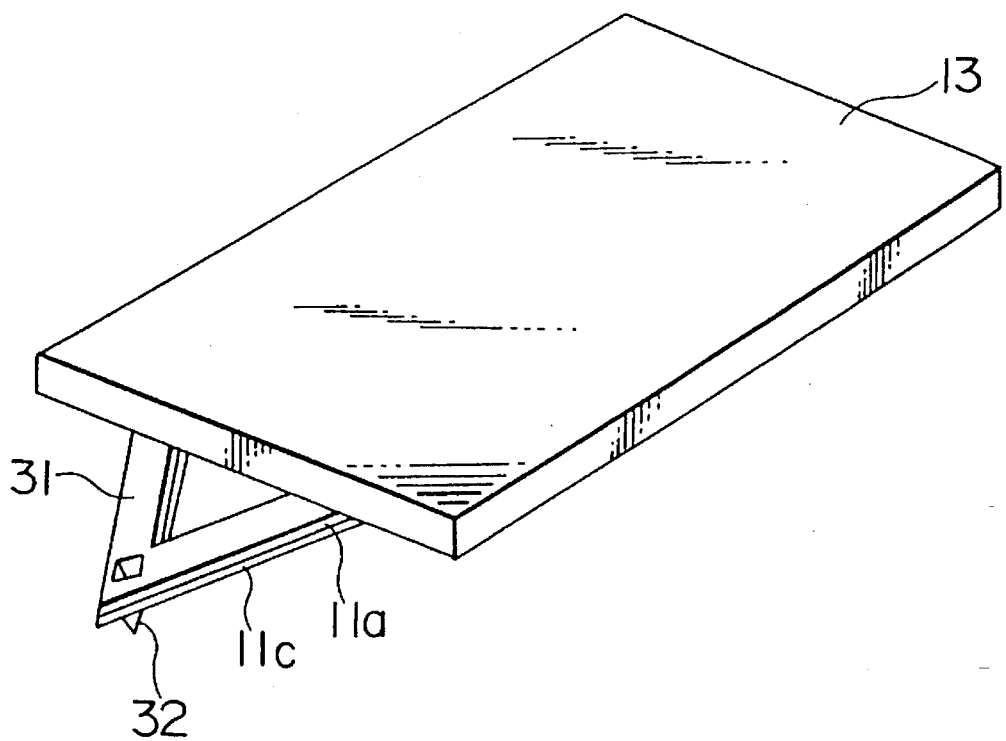
FIG. 7 is a perspective view showing a cantilever according to Embodiment 2 of the present invention.

FIG. 7 shows a cantilever according to Embodiment 2. A cantilever body 31 100 μm long and V-shaped in its plan view is fixed to one end of a rectangular glass base plate 13 which has dimensions of about 2×5 mm. A probe 32 in the form of a pyramid with its bottom surface having sides 5 μm long is disposed at the distal end of the cantilever body 31. The cantilever body 31 and the probe 32 are each a two-layer film comprising a silicon nitride film 11a and a sputtered film 11c, each of these films being 0.7 μm thick.

Figure 8A:
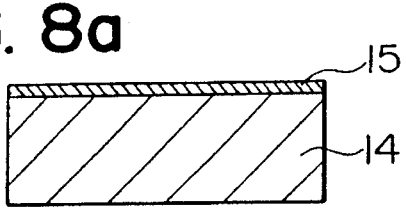
FIGS. 8a to 8k are sectional views showing successive steps of a of manufacturing the cantilever of FIG. 7, according to the present invention.
Figure 8B:
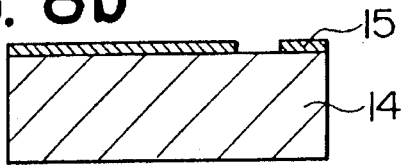
Figure 8C:
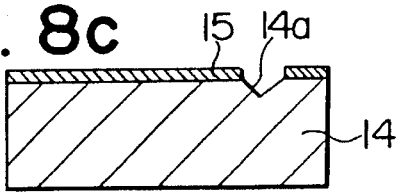
Figure 8D:
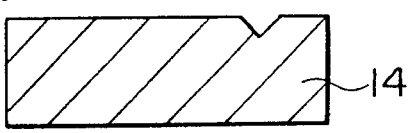
Figure 8E:
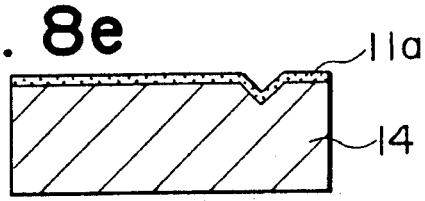

FIGS. 8a to 8k show successive steps of a method of manufacturing such a cantilever. First, a resist 15 is applied to the surface of a (100) silicon substrate 14 as shown in FIG. 8a, and a portion of the resist 15 is removed in a rectangular pattern as shown in FIG. 8b. Then, as shown in FIG. 8c, the silicon substrate 14 is subjected to the wet etching process with the resist 15 serving as a mask, so that the silicon substrate 14 is selectively etched in the (111) direction to form an etch pit 14a. After that, the resist 15 is removed as shown in FIG. 8d, and the silicon nitride film 11a is formed over the entire surface of the silicon substrate 14 as shown in FIG. 8e.

Figure 8F:
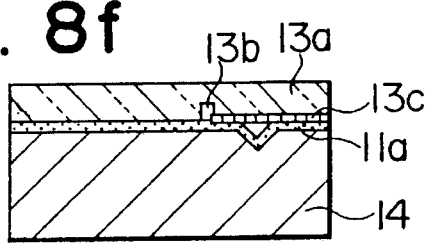
Figure 8G:
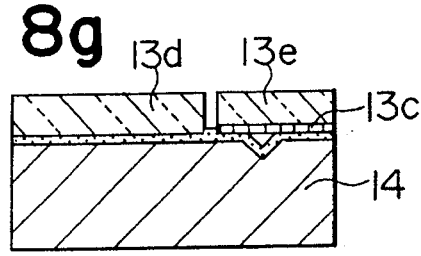
Figure 8H:
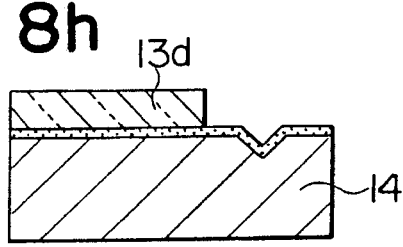
Figure 8I:
Figure 8J:
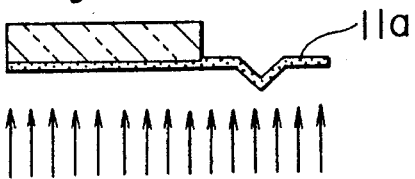
Figure 8K:
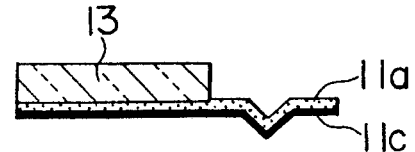

Subsequently, as shown in FIG. 8f, a glass plate 13a is bonded to the silicon nitride film 11a. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies above the etch pit 14a in the silicon substrate 14. Then, as shown in FIG. 8g, the glass plate 13a is saw-cut through the remaining portion opposite the saw cut 13b completely dividing the glass plate 13a into portions 13d and 13e. Thereafter, as shown in FIG. 8h, the glass plate portion 13e lying above the etch pit 14a is removed. Further, after removing the silicon substrate 14 as shown in FIG. 8i, a metallic film such as made of aluminum is deposited all over the back side of the silicon nitride film 11a by sputtering as shown in FIG. 8j. As a result, the sputtered film 11c is formed on the back side of the silicon nitride film 11a as shown in FIG. 8k, and a cantilever of this embodiment is produced.

In addition to aluminum, the sputtered film 11c may be any of other various sputtered films such as metallic films including molybdenum and tungsten, or oxides and nitrides of those metals.

Since the cantilever according to Embodiment 2 has the sputtered film 11c on the back side of the silicon nitride film 11a, the adhesion between the sputtered film and the sample can be measured. For example, when the sample surface is formed of a resist film, the adhesion between the sputtered film and the resist film can be evaluated.

Embodiment 3

Figure 9:
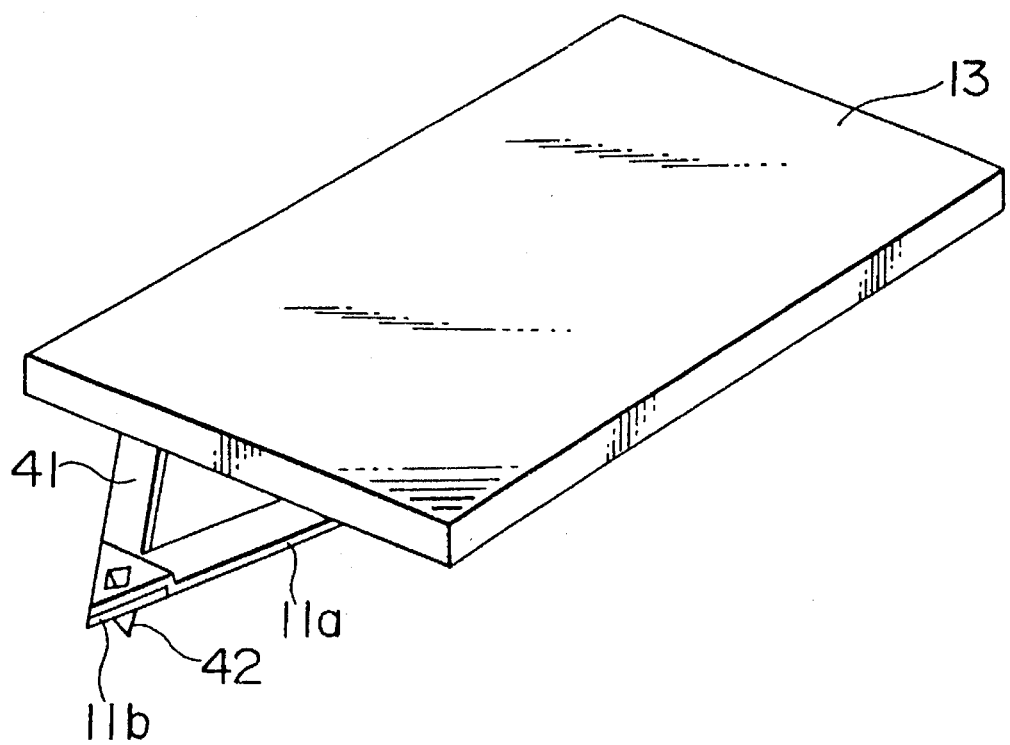
FIG. 9 is a perspective view showing a cantilever according to Embodiment 3 of the present invention.

FIG. 9 shows a cantilever according to Embodiment 3. A cantilever body 41 100 μm long and V-shaped in its plan view is fixed to one end of a rectangular glass base plate 13 which has dimensions of about 2×5 mm. A probe 42 in the form of a pyramid with its bottom surface having sides 5 μm long is located at the distal end of the cantilever body 41. The leading end portion of the cantilever body 41 and the probe 42 are each a two-layer film comprising a silicon nitride film 11a and a resist film 11b, each of these films being 0.7 μm thick. However, the remaining end portion of the cantilever body 41 is only the silicon nitride film 11a 0.7 μm thick.

Figure 10A:
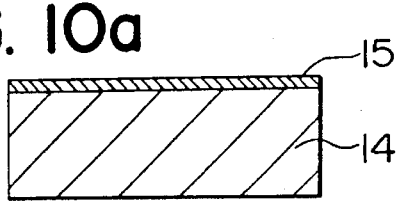
FIGS. 10a to 10k are sectional views showing successive steps of a method of manufacturing the cantilever of FIG. 9.
Figure 10B:
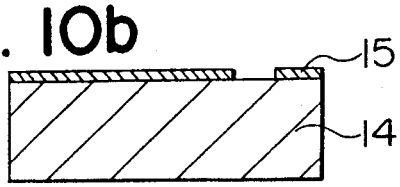
Figure 10C:
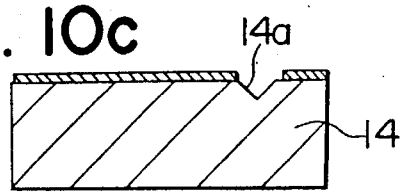
Figure 10D:
Figure 10E:
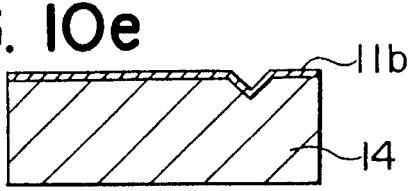

FIGS. 10a to 10k show successive steps of a method of manufacturing such a cantilever. First, a resist 15 is applied to the surface of a (100) silicon substrate 14 as shown in FIG. 10a, and a portion of the resist 15 is removed in a rectangular pattern as shown in FIG. 10b. Then, as shown in FIG. 10c, the silicon substrate 14 is subjected to the wet etching process with the resist 15 serving as a mask, so that the silicon substrate 14 is selectively etched in the (111) direction to form an etch pit 14a. After that, the resist 15 is removed as shown in FIG. 10d, and the resist film 11b is formed over the entire surface of the silicon substrate 14 as shown in FIG. 10e.

Figure 10F:
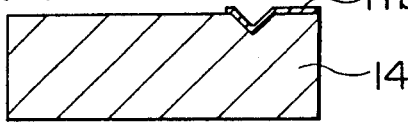
Figure 10G:
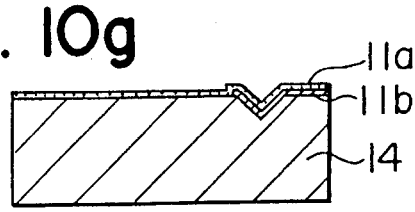
Figure 10H:
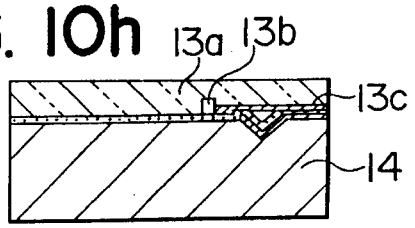
Figure 10I:
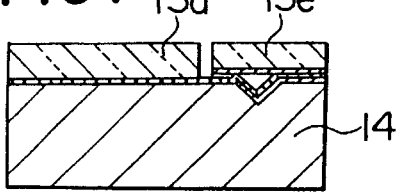
Figure 10J:
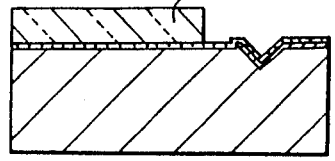
Figure 10K:
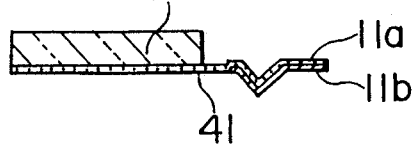

Subsequently, as shown in FIG. 10f, the resist film 11b is patterned to leave a portion of the resist film 11b near the etch pit 14a by removing the remaining portion of the resist film 11b. Then, the silicon nitride film 11a is formed on the silicon substrate 14 and the resist film 11b as shown in FIG. 10g, and a glass plate 13a is bonded onto the silicon nitride film 11a as shown in FIG. 10h. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies above the etch pit 14a in the silicon substrate 14. Then, as shown in FIG. 10i, the glass plate 13a is saw-cut through the remaining portion opposite the saw cut 13b for completely dividing the glass plate 13a into portions 13d and 13e. Thereafter, as shown in FIG. 10j, the glass plate portion 13e lying above the etch pit 14a is removed. Finally, by removing the silicon substrate 14 as shown in FIG. 10k, a cantilever of this embodiment is produced.

Figure 17:
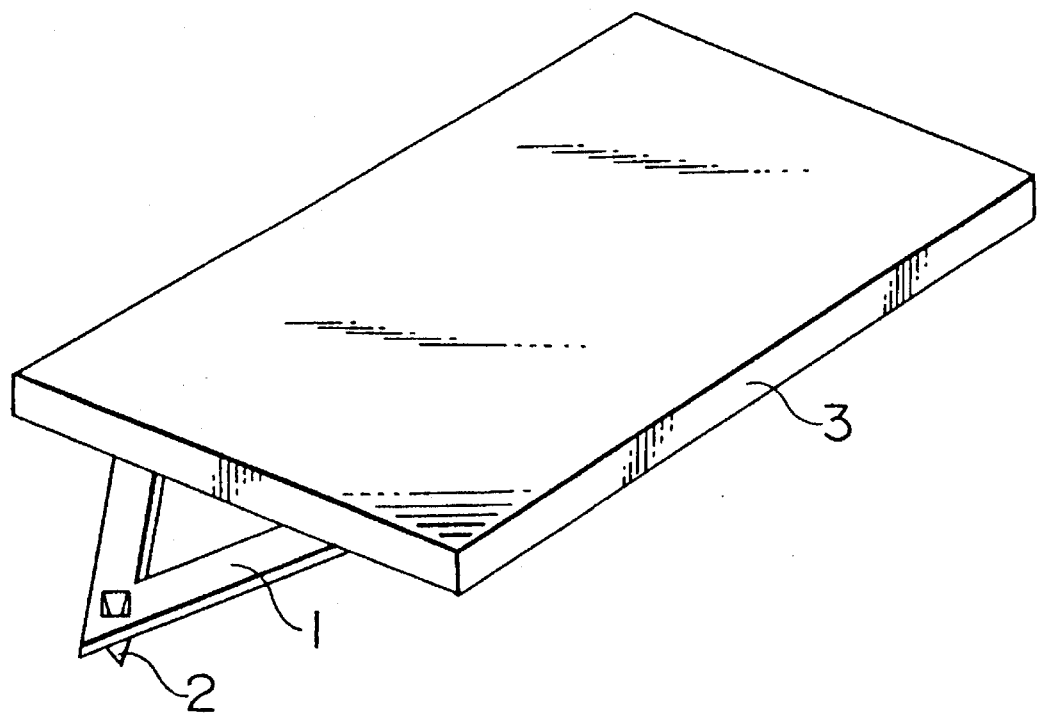
FIG. 17 is a perspective view showing a conventional cantilever.
Figure 18A:
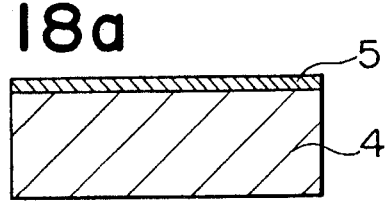
FIGS. 18a to 18i are sectional views showing successive steps of a method of manufacturing the cantilever of FIG. 17.
Figure 18B:
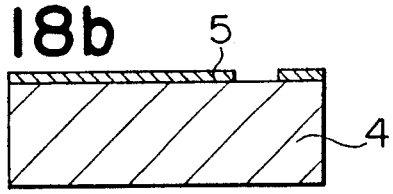
Figure 18C:
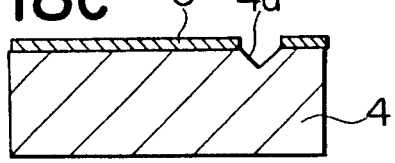
Figure 18D:
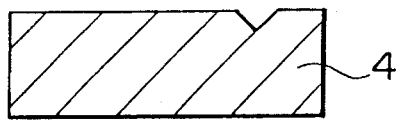
Figure 18E:
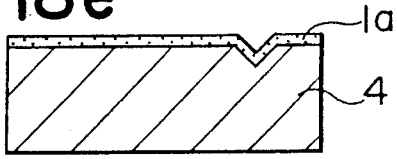
Figure 18F:
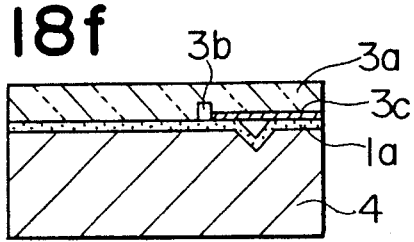
Figure 18G:
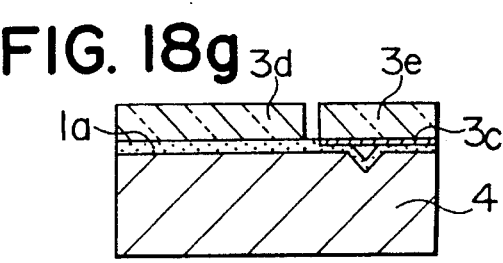
Figure 18H:
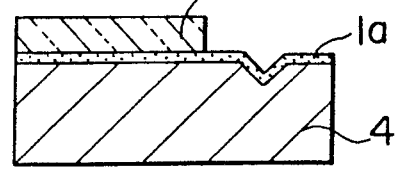
Figure 18I:
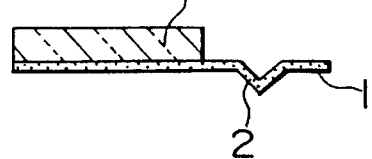
Figure 19:
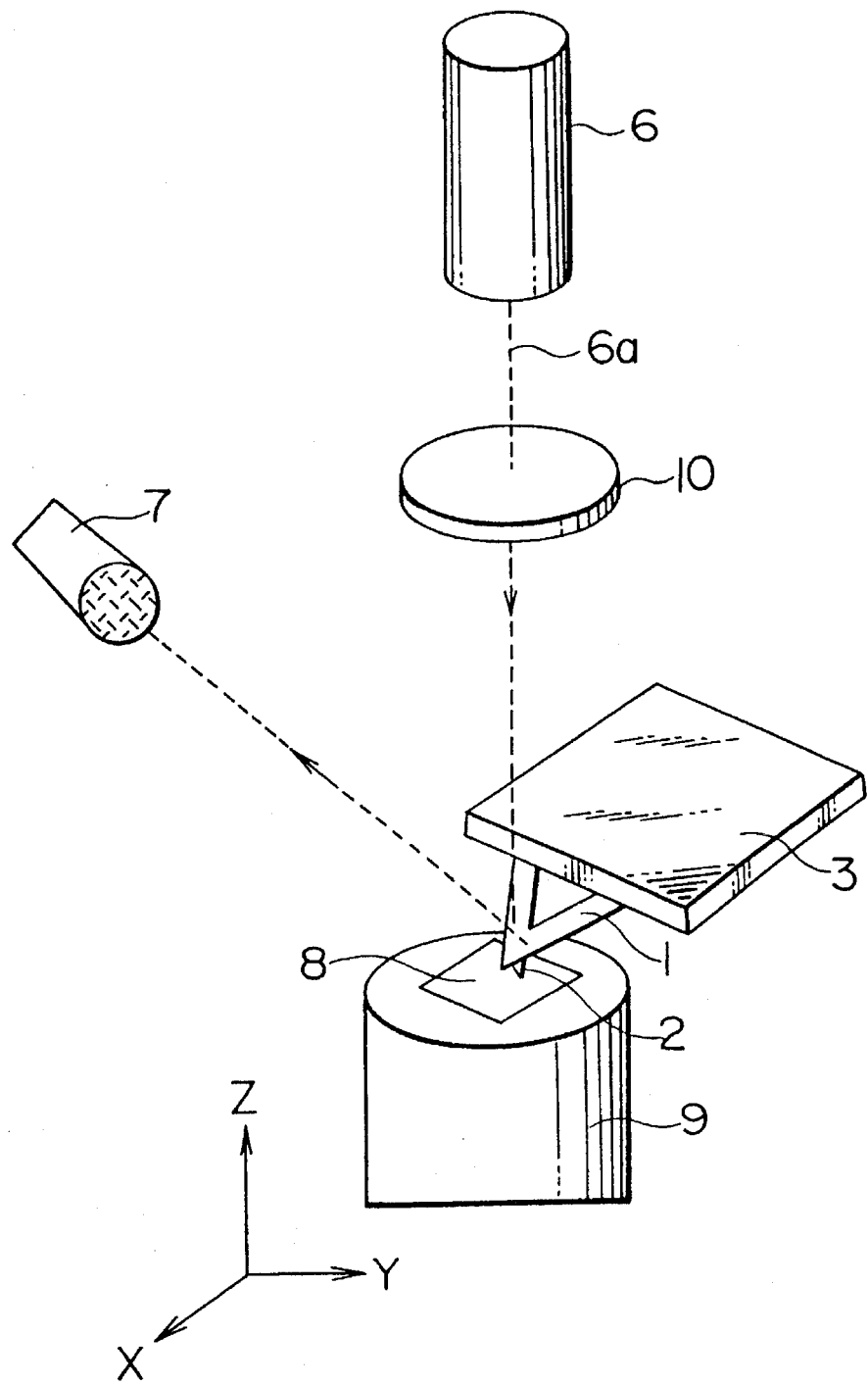
FIG. 19 is a diagram showing the operating principles of a conventional atomic force microscope.

With the cantilever according to Embodiment 3, since the proximal portion of the cantilever body 41 fixed to the glass base plate 13 is formed of a single layer, i.e., the silicon nitride film 11a having a thickness of 0.7 μm, it is possible to prevent an increase in the spring constant and a reduction in the resonance frequency of the cantilever which are caused if the cantilever body is entirely formed of a two-layer film and is relatively thick. The increase in the spring constant results in lower sensitivity, and the reduction in the resonance frequency makes the cantilever more easily affected by sounds and vibrations of the floor. Specifically, the cantilever of Embodiment 3 has a spring constant of 0.58 N/m and a resonance frequency of 77 kHz as with the conventional cantilever shown in FIG. 17. Therefore, the cantilever of Embodiment 3 is less susceptible to sounds and vibrations of the floor, and can evaluate adhesion with higher accuracy.

Embodiment 4

Figure 11:
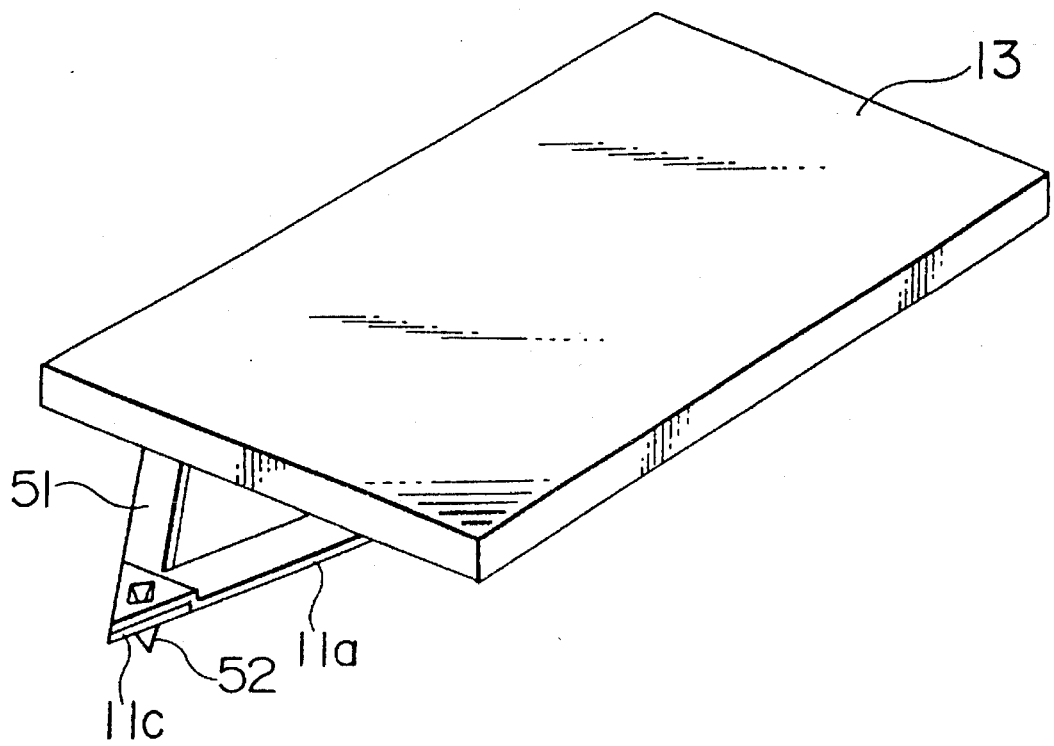
FIG. 11 is a perspective view showing a cantilever according to Embodiment 4 of the present invention.

FIG. 11 shows a cantilever according to Embodiment 4. A cantilever body 51 100 μm long and V-shaped in its plan view is fixed to one end of a rectangular glass base plate 13 which has dimensions of about 2×5 mm. A probe 52 in the form of a pyramid with its bottom surface having sides 5 82 m long is formed at the distal end of the cantilever body 51. The leading end portion of the cantilever body 51 and the probe 52 are each a two-layer film comprising a silicon nitride film 11a and a sputtered film 11c, each of these films being 0.7 µm thick. However, the remaining end portion of the cantilever body 51 is formed of only the silicon nitride film 11a being 0.7 µm thick.

Figure 12A:
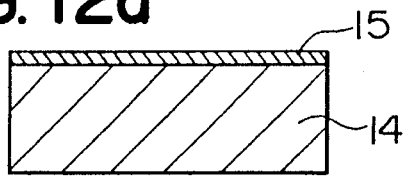
FIGS. 12a to 12k are sectional views showing successive steps of a method of manufacturing the cantilever of FIG. 11.
Figure 12B:
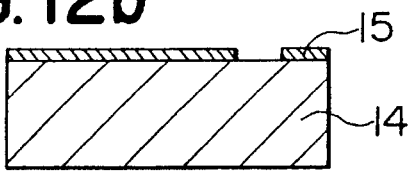
Figure 12C:
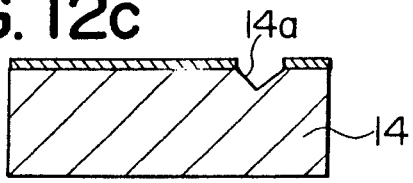
Figure 12D:
Figure 12E:
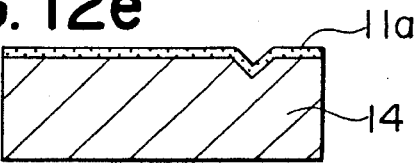

FIGS. 12a to 12k show successive steps of a method of manufacturing such a cantilever. First, a resist 15 is applied to the surface of a (100) silicon substrate 14 as shown in FIG. 12a, and a portion of the resist 15 is removed in a rectangular pattern as shown in FIG. 12b. Then, as shown in FIG. 12c, the silicon substrate 14 is subjected to the wet etching process with the resist 15 serving as a mask, so that the silicon substrate 14 is selectively etched in the (111) direction to form an etch pit 14a. After that, the resist 15 is removed as shown in FIG. 12d, and the silicon nitride film 11a is formed over the entire surface of the silicon substrate 14 as shown in FIG. 12e.

Figure 12F:
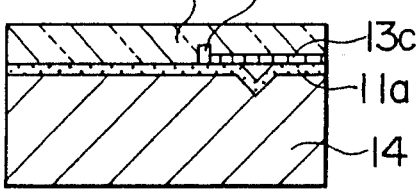
Figure 12G:
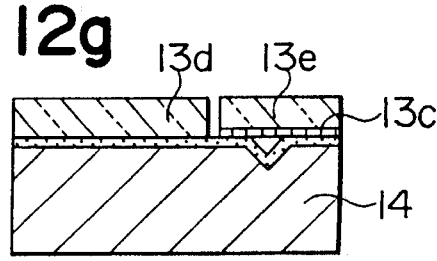
Figure 12H:
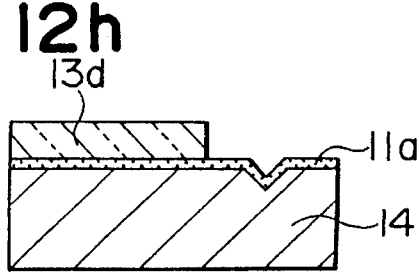
Figure 12I:
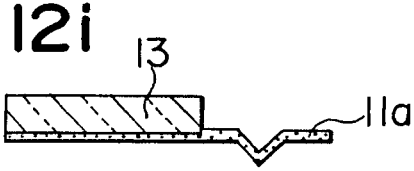
Figure 12J:
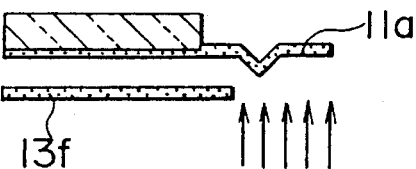
Figure 12K:
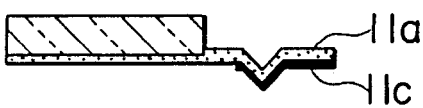

Subsequently, as shown in FIG. 12f, a glass plate 13a is bonded to the silicon nitride film 11a. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies above the etch pit 14a in the silicon substrate 14. Then, as shown in FIG. 12g, the glass plate 13a is saw-cut through the remaining portion opposite the saw cut 13b for completely dividing the glass plate 13a into portions 13d and 13e. Thereafter, as shown in FIG. 12h, the glass plate portion 13e lying above the etch pit 14a is removed. Further, after removing the silicon substrate 14 as shown in FIG. 12i, a metallic film is deposited on the back side of the silicon nitride film 11a by sputtering as shown in FIG. 12j. At this time, a mask 13f is used to shadow sputtered particles so that the sputtered film 11c is selectively formed on the back side of the silicon nitride film 11a as shown in FIG. 12k.

With the cantilever manufacturing method of this embodiment, there can be obtained a cantilever in which the probe surface is covered with the sputtered film 11c, and having a spring constant and resonance frequency comparable to those in Embodiment 3 described above. In other words, this embodiment can also evaluate adhesion with higher accuracy without being affected by sounds and vibrations of the floor.

Embodiment 5

Figure 13:
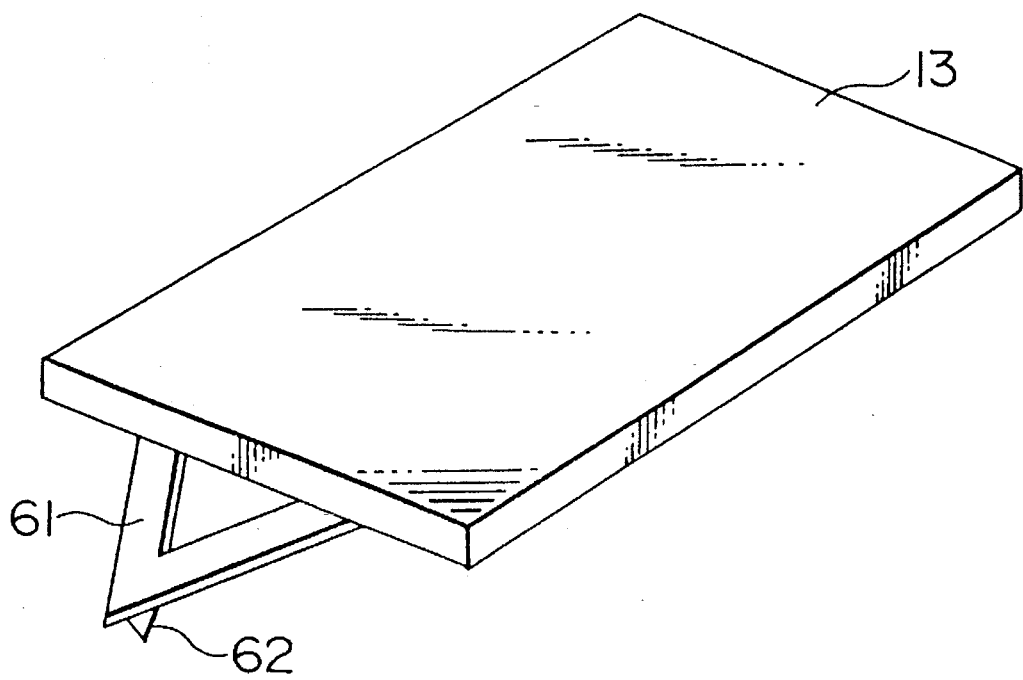
FIG. 13 is a perspective view showing a cantilever according to Embodiment 5 of the present invention.

FIG. 13 shows a cantilever according to Embodiment 5. A cantilever body 61 being 100 µm long and V-shaped in its plan view is fixed to one end of a rectangular glass base plate 13 which has dimensions of about 2×5 mm. A probe 62 in the form of a pyramid with its bottom surface having sides 5 µm long is formed at the distal end of the cantilever body 61. The cantilever body 61 is a silicon nitride film 0.7 µm thick and the probe 32 is a resist film.

Figure 14A:
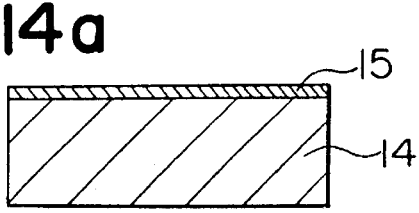
Figure 14B:
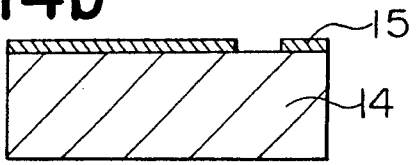
Figure 14C:
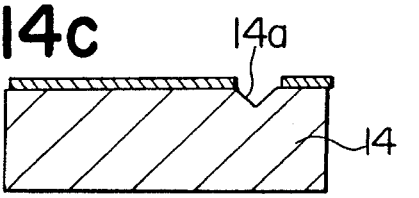
Figure 14D:
Figure 14E:
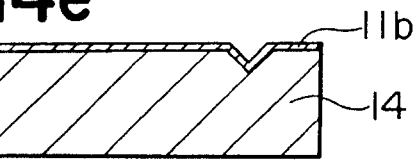

FIGS. 14a to 14l show successive steps of a method of manufacturing such a cantilever. First, a resist 15 is applied to the surface of a (100) silicon substrate 14 as shown in FIG. 14a, and a portion of the resist 15 is removed in a rectangular pattern as shown in FIG. 14b. Then, as shown in FIG. 14c, the silicon substrate 14 is subjected to the wet etching process with the resist 15 serving as a mask, so that the silicon substrate 14 is selectively etched in the (111) direction to form an etch pit 14a. After that, the resist 15 is removed as shown in FIG. 14d, and a resist film 11b is formed over the entire surface of the silicon substrate 14 as shown in FIG. 14e.

Figure 14F:
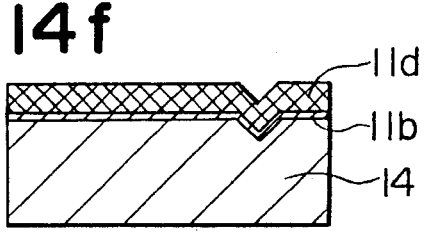
Figure 14G:
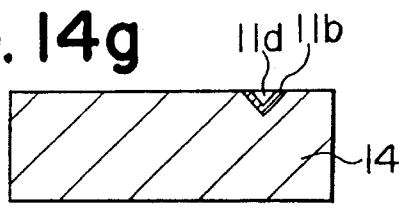
Figure 14H:
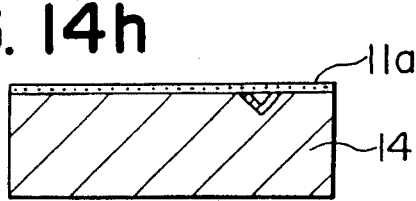
Figure 14I:
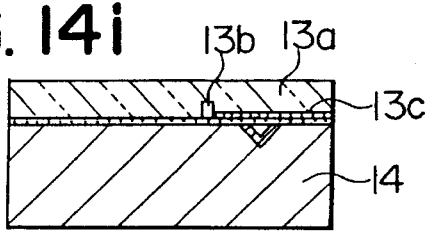
Figure 14J:
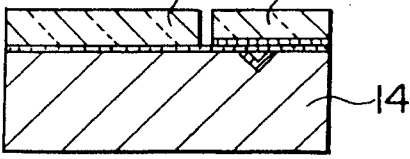
Figure 14K:
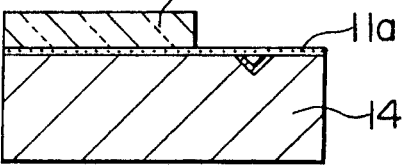
Figure 14K:
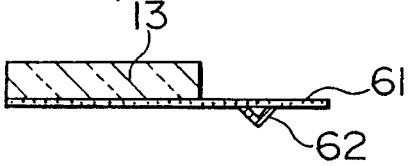

Subsequently, another thick resist film 11d is formed over the entire surface of the resist film 11b as shown in FIG. 14f, and both the resist films 11b and 11d are etched by the etch-back method until the silicon substrate 14 is exposed in its flat portion, as shown in FIG. 14g. In this condition, the etch pit 14a is filled with both the resist films 11b and 11d. Then, a silicon nitride film 11a is formed on the flat surface of the silicon substrate 14 and the resist films 11b and 11d as shown in FIG. 14h, and a glass plate 13a is bonded to the silicon nitride film 11a as shown in FIG. 14i. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies opposite the etch pit 14a in the silicon substrate 14. Then, as shown in FIG. 14j, the glass plate 13a is saw-cut through the remaining portion opposite the saw cut 13b completely dividing the glass plate 13a into portions 13d and 13e. Thereafter, as shown in FIG. 8h, the glass plate portion 13e lying above the etch pit 14a is removed. Finally, by removing the silicon substrate 14 as shown in FIG. 14l, a cantilever of this embodiment is produced.

With the cantilever according to Embodiment 5, since only the probe 62 is formed of a resist film and the cantilever body 61 is formed of a single layer, i.e., the silicon nitride film 11a, it is possible to effectively prevent an increase in the spring constant and a reduction in the resonance frequency of the cantilever so that the cantilever of Embodiment 5 can have a spring constant and resonance frequency comparable to those in Embodiment 3 described above. In other words, this embodiment can also evaluate adhesion with higher accuracy without being affected by sounds and vibrations of the floor.

Embodiment 6

Figure 15:
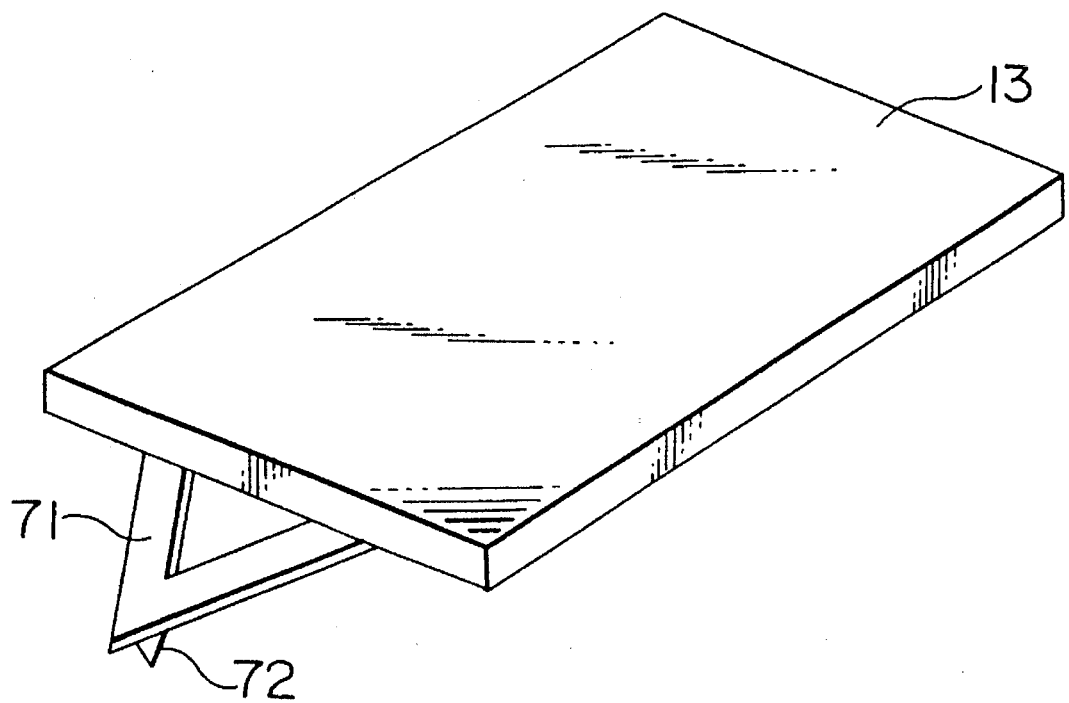
FIG. 15 is a perspective view showing a cantilever according to Embodiment 6 of the present invention.

FIG. 15 shows a cantilever according to Embodiment 6. A cantilever body 71 100 µm long and V-shaped in its plan view is fixed to one end of a rectangular glass base plate 13 which has dimensions of about 2×5 mm. A probe 72 in the form of a pyramid with its bottom surface having sides 5 µm long is disposed at the distal end of the cantilever body 71. The cantilever body 71 is a silicon nitride film 0.7 0.7 µm thick and the surface of the probe 72 is a sputtered film.

Figure 16A:
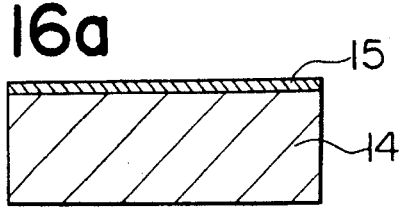
Figure 16B:
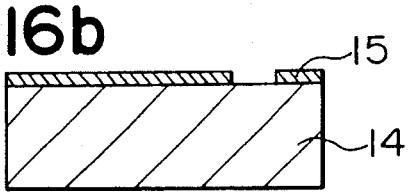
Figure 16C:
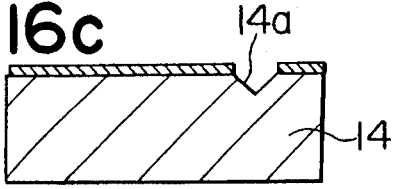
Figure 16D:
Figure 16E:

FIGS. 16a to 16l show successive steps of a method of manufacturing such a cantilever. First, a resist 15 is applied to the surface of a (100) silicon substrate 14 as shown in FIG. 16a, and a portion of the resist 15 is removed in a rectangular pattern as shown in FIG. 16b. Then, as shown in FIG. 16c, the silicon substrate 14 is subjected to the wet etching process with the resist 15 serving as a mask, so that the silicon substrate 14 is selectively etched in the (111) direction to form an etch pit 14a. After that, the resist 15 is removed as shown in FIG. 16d, and a sputtered film 11c is formed over the entire surface of the silicon substrate 14 as shown in FIG. 16e.

Figure 16F:
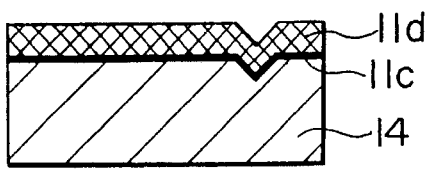
Figure 16G:
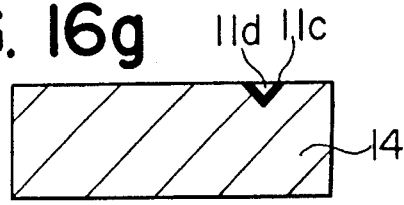
Figure 16H:
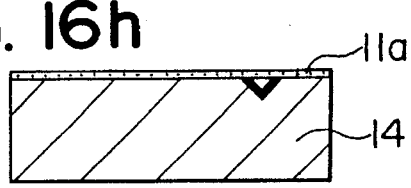
Figure 16I:
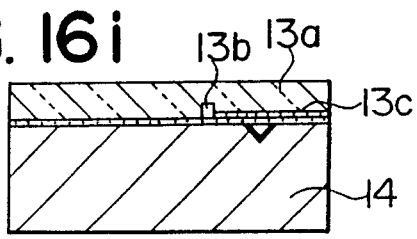
Figure 16J:
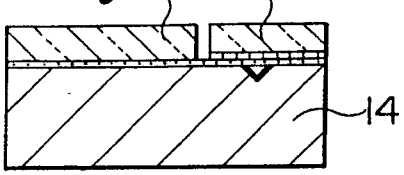
Figure 16K:
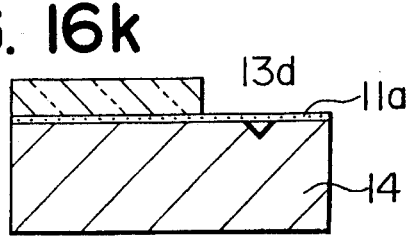

Subsequently, a thick resist film 11d is formed over the entire surface of the sputtered film 11c as shown in FIG. 16f, and both the resist film 11d and the sputtered film 11c are etched by the etch-back method until the silicon substrate 14 is exposed in its flat portion, as shown in FIG. 16g. In this condition, the etch pit 14a is filled with the sputtered film 11c and the resist films 11d. Then, a silicon nitride film 11a is formed on the flat surface of the silicon substrate 14, the sputtered film 11c and the resist film 11d as shown in FIG. 16h, and a glass plate 13a is bonded onto the silicon nitride film 11a as shown in FIG. 16i. The surface of the glass plate 13a facing the silicon nitride film 11a is divided into two areas by a previously prepared saw cut 13b. A chromium coating 13c serving to release the glass surface from the silicon nitride film 11a is formed on the surface area of the glass plate 13a which lies above the etch pit 14a in the silicon substrate 14. Then, as shown in FIG. 16j, the glass plate 13a is saw-cut through the remaining portion opposite the saw cut 13b for completely dividing the glass plate 13a into portions 13d and 13e. Thereafter, as shown in FIG. 16k, the glass plate portion 13e lying above the etch pit 14a is removed. Finally, by removing the silicon substrate 14 as shown in FIG. 16l, a cantilever of this embodiment is produced.

With the cantilever according to Embodiment 6, since only the surface of the probe 72 is a sputtered film and the cantilever body 71 is a single layer, i.e., the silicon nitride film 11a, there can be produced a cantilever having a spring constant and resonance frequency held in a desired range. In other words, the cantilever of Embodiment 6 can also have a spring constant and a resonance frequency comparable to those in Embodiment 3 described above, and hence can evaluate adhesion with higher accuracy without being affected by sounds and vibrations of the floor.

While the probe of the cantilever is a resist film and/or a sputtered film in the above-described embodiments, the present invention is not limited to the use of those films. For example, a $SiO_2$ film, polysilicon film, Al-base film, W-base film, Mo-base film, Ti-base film, etc., which are formed by a CVD method or a thermal method, can also be used.

Additionally, the present invention can be applied as an in-line measuring method for a semiconductor process by attaching a semiconductor wafer, as the sample 18, to the piezoelectric device 19 in FIG. 3.

What is claimed is:

1. A cantilever for an atomic force microscope comprising:
    a pointed probe, and
    a cantilever body supporting said pointed probe and deflecting in response to an atomic force between said pointed probe and a sample, said pointed probe including a resist film and a silicon nitride film.

2. The cantilever according to claim 1, wherein said cantilever body comprises a silicon nitride film and a resist film.

3. The cantilever according to claim 1, wherein a leading end portion of said cantilever body comprises a silicon nitride film and a resist film and a remaining portion of said cantilever body is a silicon nitride film.

4. A cantilever for an atomic force microscope comprising:
    a pointed probe, and
    a cantilever body supporting said pointed probe and deflecting in response to an atomic force between said pointed probe and a sample, wherein said pointed probe consists of a resist and said cantilever body consists of silicon nitride.

5. A cantilever for an atomic force microscope comprising:
    a pointed probe comprising a silicon nitride film and a sputtered film, and
    a cantilever body supporting said pointed probe and deflecting in response to an atomic force between said pointed probe and a sample, wherein said cantilever body comprises a leading end portion comprising a silicon nitride film and a resist film and the remaining portion of said cantilever body is a silicon nitride film.

6. A method of manufacturing a cantilever for an atomic force microscope comprising:
    selectively etching a silicon substrate to form an etch pit in the substrate,
    forming a resist film on said silicon substrate and in the etch pit,
    forming a nitride film on said resist film,
    forming a glass base plate on said nitride film spaced from and not opposite the etch pit, and
    removing said silicon substrate.

7. A method of manufacturing a cantilever for an atomic force microscope comprising:
    selectively etching a silicon substrate to form an etch pit in the substrate,
    forming a nitride film on said silicon substrate and in the etch pit,
    forming a glass base plate on said nitride film spaced from and not opposite the etch pit,
    removing said silicon substrate, and
    forming a sputtered film on said nitride film.

8. A method of manufacturing a cantilever for an atomic force microscope comprising:
    selectively etching a silicon substrate to form an etch pit in the substrate,
    filling the etch pit with a resist film,
    forming a nitride film on said silicon substrate opposite the etch pit,
    forming a glass base plate on said nitride film spaced from and not opposite the etch pit, and
    removing said silicon substrate.

9. A method of manufacturing a cantilever for an atomic force microscope comprising:
    selectively etching a silicon substrate to form an etch pit in the substrate,
    forming a sputtered film in the etch pit in said silicon substrate,
    forming a resist film on said sputtered film, filling the etch pit with the sputtered and resist films,
    forming a nitride film on the surface of said silicon substrate opposite the etch pit,
    forming a glass base plate on said nitride film spaced from and not opposite the etch pit, and
    removing said silicon substrate.

* * * * *